United States Patent
Gunda et al.

(10) Patent No.: US 11,974,520 B2
(45) Date of Patent: May 7, 2024

(54) AUTOMATIC PRODUCT HARVESTING CONTROL SYSTEM

(71) Applicant: Deere & Company, Moline, IL (US)

(72) Inventors: Rahul Gunda, Pune (IN); Bryan E. Dugas, Napoleonville, LA (US); John A. Dighton, Thibodaux, LA (US); Peter A. Johnson, Thibodaux, LA (US)

(73) Assignee: Deere & Company, Moline, IL (US)

( * ) Notice: Subject to any disclaimer, the term of this patent is extended or adjusted under 35 U.S.C. 154(b) by 867 days.

(21) Appl. No.: 17/020,225

(22) Filed: Sep. 14, 2020

(65) Prior Publication Data

US 2020/0404844 A1 Dec. 31, 2020

Related U.S. Application Data

(62) Division of application No. 15/904,626, filed on Feb. 26, 2018, now Pat. No. 10,806,079.

(51) Int. Cl.
*A01D 45/10* (2006.01)
*A01D 57/22* (2006.01)
*A01D 75/00* (2006.01)

(52) U.S. Cl.
CPC ............ *A01D 45/10* (2013.01); *A01D 57/22* (2013.01); *A01D 75/00* (2013.01)

(58) Field of Classification Search
CPC ......... A01D 45/10; A01D 57/22; A01D 75/00
See application file for complete search history.

(56) References Cited

U.S. PATENT DOCUMENTS 3,103,091 A * 9/1963 Duncan .................. A01D 45/10
                                                      56/16.6
3,141,281 A * 7/1964 Gaunt .................... A01D 45/10
                                                      56/14.5

(Continued)

FOREIGN PATENT DOCUMENTS

BR       PI0403614 A      12/2005
BR  102017001629 A2       8/2018
(Continued)

OTHER PUBLICATIONS

Cho et al., "Autonomous positioning of the unloading auger of a combine harvester by a laser sensor and GNSS," research paper (2015) Engineering in Agriculture, Environment and Food 8, pp. 178-186, journal homepage: http://www.sciencedirect.com/eaef.

*Primary Examiner* — Adam J Behrens
(74) *Attorney, Agent, or Firm* — Michael Best & Friedrich LLP

(57) ABSTRACT

A control system for a harvester includes a plurality of actuators, each of which moves of one of the following: a knockdown roller for pressing crops down, a side knife for cutting crops along a substantially vertical plane, a base cutter for cutting crops along a substantially horizontal plane, and a crop divider configured to separate crops into rows. The control system also includes a controller in electrical communication with each actuator of the plurality of actuators. The controller receives a signal indicative of an operational position of at least one actuator of the plurality of actuators, and sends a signal to the at least one actuator of the plurality of actuators to initiate movement of the at least one actuator of the plurality of actuators in response to the received signal.

20 Claims, 4 Drawing Sheets

(56) References Cited

U.S. PATENT DOCUMENTS

| | | | |
|---|---|---|---|
| 3,599,404 A * | 8/1971 | Fernandez | A01D 45/10 56/98 |
| 3,645,073 A * | 2/1972 | Gomes | A01D 45/10 56/13.8 |
| 3,791,114 A * | 2/1974 | Fowler | A01D 45/10 56/317 |
| 4,155,602 A * | 5/1979 | Quick | A01D 45/10 209/139.1 |
| 4,924,662 A * | 5/1990 | Quick | A01D 45/10 56/122 |
| 6,807,799 B2 | 10/2004 | Reaux | |
| 7,401,455 B1 | 7/2008 | Cleodolphi | |
| 7,681,388 B1 * | 3/2010 | Hinds | A01D 47/00 56/126 |
| 8,452,501 B1 | 5/2013 | Lange et al. | |
| 9,301,446 B2 | 4/2016 | Peters et al. | |
| 9,402,344 B1 * | 8/2016 | Wenzel | B60W 10/26 |
| 9,456,547 B2 * | 10/2016 | Cazenave | A01D 45/10 |
| 10,076,076 B2 * | 9/2018 | Craig | A01D 45/10 |
| 2004/0053653 A1 * | 3/2004 | Isfort | A01D 43/087 460/119 |
| 2005/0055147 A1 | 3/2005 | Hrazdera et al. | |
| 2005/0210851 A1 | 9/2005 | Covington et al. | |
| 2005/0284119 A1 | 12/2005 | Brunnert | |
| 2006/0123757 A1 | 6/2006 | Baumgarten et al. | |
| 2007/0255470 A1 | 11/2007 | Diekhans et al. | |
| 2007/0271893 A1 | 11/2007 | Pollklas et al. | |
| 2008/0092506 A1 | 4/2008 | Philips et al. | |
| 2008/0133095 A1 | 6/2008 | Erdmann et al. | |
| 2008/0249692 A1 | 10/2008 | Dix | |
| 2008/0269956 A1 | 10/2008 | Dix et al. | |
| 2009/0037096 A1 | 2/2009 | Senneff et al. | |
| 2009/0038282 A1 | 2/2009 | Avalle et al. | |
| 2009/0216406 A1 | 8/2009 | Senneff et al. | |
| 2009/0229233 A1 | 9/2009 | Pollklas et al. | |
| 2010/0223896 A1 | 9/2010 | Eick et al. | |
| 2010/0307121 A1 * | 12/2010 | Marchini | A01D 75/28 56/63 |
| 2011/0093169 A1 | 4/2011 | Schroeder et al. | |
| 2011/0112730 A1 | 5/2011 | Rekow | |
| 2011/0203243 A1 | 8/2011 | Finkler et al. | |
| 2013/0103269 A1 | 4/2013 | Meyer Zu Helligen et al. | |
| 2013/0211658 A1 | 8/2013 | Bonefas | |
| 2014/0053092 A1 | 2/2014 | Grevinga et al. | |
| 2014/0208708 A1 | 7/2014 | Waechter et al. | |
| 2014/0311814 A1 | 10/2014 | Morselli et al. | |
| 2015/0012181 A1 | 1/2015 | Brunnert et al. | |
| 2015/0296708 A1 * | 10/2015 | Mello | A01D 34/661 56/13.6 |
| 2015/0305241 A1 | 10/2015 | Waechter et al. | |
| 2015/0319925 A1 | 11/2015 | Ricketts et al. | |
| 2015/0327438 A1 * | 11/2015 | Cazenave | A01D 45/10 56/51 |
| 2015/0331408 A1 * | 11/2015 | Richard | G05B 19/19 700/114 |
| 2015/0331423 A1 | 11/2015 | Volger et al. | |
| 2015/0342118 A1 * | 12/2015 | Corbett | A01D 41/1274 73/114.25 |
| 2015/0362904 A1 * | 12/2015 | Scrivner | A01D 41/127 700/275 |
| 2016/0157414 A1 | 6/2016 | Ackerman et al. | |
| 2016/0159391 A1 | 6/2016 | Fischer et al. | |
| 2016/0205869 A1 | 7/2016 | Wenzel et al. | |
| 2016/0212941 A1 * | 7/2016 | Halmann | A01D 75/00 |
| 2017/0000026 A1 * | 1/2017 | Seki | A01D 34/661 |
| 2017/0112059 A1 * | 4/2017 | Craig | A01D 45/10 |
| 2017/0202131 A1 | 7/2017 | Bunderson et al. | |
| 2017/0245434 A1 | 8/2017 | Jung et al. | |
| 2017/0251601 A1 * | 9/2017 | Dugas | A01F 12/48 |
| 2017/0261978 A1 | 9/2017 | Gresch | |
| 2017/0325394 A1 | 11/2017 | Clement et al. | |
| 2017/0354078 A1 | 12/2017 | Foster et al. | |
| 2018/0054954 A1 | 3/2018 | De Nale et al. | |
| 2018/0242517 A1 | 8/2018 | Davis et al. | |
| 2018/0321683 A1 | 11/2018 | Foster et al. | |
| 2018/0329619 A1 | 11/2018 | Wieckhorst et al. | |
| 2018/0329620 A1 | 11/2018 | Cabrespine et al. | |
| 2018/0338426 A1 * | 11/2018 | Seki | A01D 34/664 |
| 2018/0364739 A1 | 12/2018 | Foster et al. | |
| 2018/0373256 A1 | 12/2018 | Runde et al. | |
| 2018/0373257 A1 | 12/2018 | Runde et al. | |
| 2019/0116717 A1 | 4/2019 | Pauli et al. | |
| 2019/0208695 A1 | 7/2019 | Graf Plessen | |
| 2019/0327889 A1 | 10/2019 | Borgstadt | |
| 2019/0353483 A1 | 11/2019 | Liu et al. | |
| 2019/0373814 A1 * | 12/2019 | Murray | A01D 43/08 |
| 2020/0024102 A1 | 1/2020 | Brill et al. | |
| 2020/0060087 A1 * | 2/2020 | Murray | A01D 61/00 |
| 2020/0128745 A1 | 4/2020 | Bueermann | |
| 2020/0170187 A1 | 6/2020 | Gutknecht et al. | |
| 2020/0187409 A1 | 6/2020 | Meyer Zu Helligen | |
| 2020/0269938 A1 | 8/2020 | Silies et al. | |
| 2020/0296878 A1 | 9/2020 | Dix | |
| 2020/0337204 A1 | 10/2020 | Hertzog et al. | |
| 2020/0337211 A1 | 10/2020 | Hertzog et al. | |
| 2020/0404842 A1 | 12/2020 | Dugas et al. | |
| 2021/0007283 A1 | 1/2021 | Boll | |

FOREIGN PATENT DOCUMENTS

| | | | |
|---|---|---|---|
| CN | 105144980 A | 12/2015 | |
| DE | 102007055073 A1 | 5/2009 | |
| DE | 102011017620 A1 | 10/2012 | |
| DE | 102011085380 A1 | 5/2013 | |
| DE | 102012205337 A1 | 10/2013 | |
| DE | 102012109085 A1 | 3/2014 | |
| DE | 102013209197 A1 | 11/2014 | |
| DE | 102013213588 A1 | 1/2015 | |
| DE | 102014201092 A1 | 7/2015 | |
| DE | 102015110567 A1 | 1/2017 | |
| DE | 102016118651 A1 | 4/2018 | |
| DE | 102016122291 A1 | 5/2018 | |
| DE | 102018116800 A1 | 1/2020 | |
| DE | 102018213212 A1 | 2/2020 | |
| DE | 102019111089 A1 | 11/2020 | |
| EP | 1380202 A1 | 1/2004 | |
| EP | 1800528 A1 | 6/2007 | |
| EP | 1800530 A1 | 6/2007 | |
| EP | 2425696 A1 | 3/2012 | |
| EP | 2436251 A1 | 4/2012 | |
| EP | 2499897 A1 | 9/2012 | |
| EP | 2705744 A2 | 3/2014 | |
| EP | 3132665 A1 | 2/2017 | |
| EP | 3146825 A1 | 3/2017 | |
| EP | 3259976 A1 | 12/2017 | |
| EP | 3299996 A1 | 3/2018 | |
| EP | 3300579 A1 | 4/2018 | |
| EP | 3332628 A1 | 6/2018 | |
| EP | 3354125 A1 | 8/2018 | |
| EP | 3563658 A1 | 11/2019 | |
| EP | 3603379 A1 | 2/2020 | |
| EP | 3735812 A1 | 11/2020 | |
| GB | 2455967 A | 7/2009 | |
| IN | 04028MU2014 A | 6/2016 | |
| JP | 2002262653 A | 9/2002 | |
| JP | 2005341815 A | 12/2005 | |
| WO | WO12016752 A1 | 2/2012 | |
| WO | 2015156774 A1 | 10/2015 | |
| WO | WO-2017094588 A1 * | 6/2017 | A01D 45/10 |
| WO | 2017170507 A1 | 10/2017 | |
| WO | WO-2018037543 A1 * | 3/2018 | A01D 45/10 |
| WO | WO-2019051572 A1 * | 3/2019 | A01D 45/003 |
| WO | WO21005406 A1 | 1/2021 | |
| ZA | 7503275 A * | 3/1976 | A01D 45/10 |

* cited by examiner

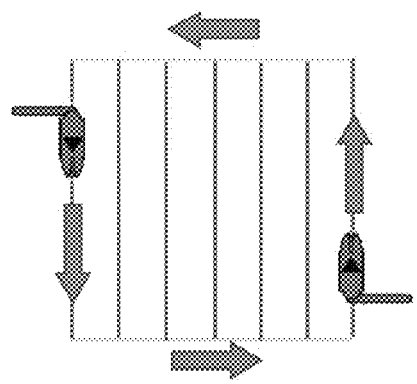
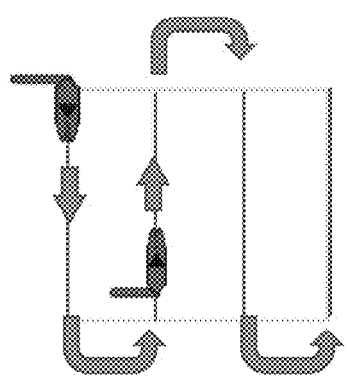
FIG. 3A                FIG. 3B
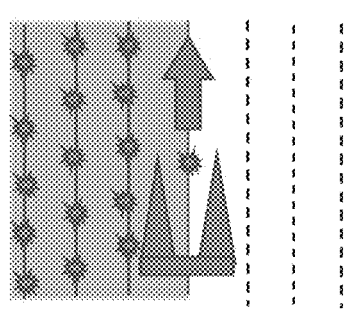
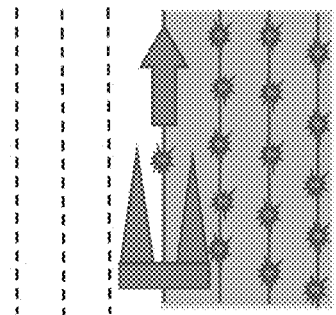
FIG. 4A                FIG. 4B

AUTOMATIC PRODUCT HARVESTING CONTROL SYSTEM

CROSS-REFERENCE TO RELATED APPLICATION

The present application is a divisional of U.S. application Ser. No. 15/904,626, filed Feb. 26, 2018, the entire contents of which are herein incorporated by reference.

BACKGROUND

The present disclosure relates to a method of harvesting material.

SUMMARY

In one embodiment, the disclosure provides a method of moving a component of a harvester. The harvester includes a topper for cutting top portions of crops, a conveyor for transporting the cut stalks of the crops, a primary hood, and a secondary hood, each of the primary and secondary hoods operable to direct the cut top portions of the crops away from the conveyor. The method includes selecting a cutting mode of operation from the following modes of operation: circular cutting mode and face cutting mode; selecting a crop position from the following crop positions: crop at right and crop at left; selecting at least one component from the following components: the conveyor, the primary hood, or the secondary hood; and in response to selecting at least one component, automatically moving the selected at least one component to one of a first operational position or a second operational position.

In another embodiment the disclosure provides a method of moving a component of a harvester. The harvester includes a side knife for cutting crops along a substantially vertical plane, a base cutter for cutting crops along a substantially horizontal plane, and a crop divider configured to separate crops into rows. The method includes selecting a cutting mode of operation from the following modes of operation: circular cutting mode and face cutting mode; selecting a crop position from the following crop positions: crop at right and crop at left; selecting at least one component from the following components: the side knife, the base cutter, or the crop divider; and in response to selecting the at least one component, automatically moving the selected at least one component to one of an operational position or a travel position.

In another embodiment the disclosure provides a control system for a harvester. The control system includes a plurality of actuators. Each actuator is operable to control movement of one of the following: a topper for cutting top portions of crops, a base cutter for cutting bottom potions of the crops to separate stalks of the crops from roots of the crops, a conveyor for transporting the cut stalks of the crops, a primary hood, and a secondary hood, each of the primary and secondary hoods operable to direct the cut top portions of the crops away from the conveyor. The control system further includes a controller in electrical communication with each actuator of the plurality of actuators. The controller is configured to receive a signal indicative of an operational position of at least one actuator of the plurality of actuators associated with the conveyor, the primary hood, and the secondary hood, and send a signal to the at least one actuator of the plurality of actuators to initiate movement of the at least one actuator of the plurality of actuators in response to the received signal.

In another embodiment the disclosure provides a control system for a harvester. The control system includes a plurality of actuators. Each actuator is operable to control movement of one of the following: a knockdown roller for pressing crops down, a side knife for cutting crops along a substantially vertical plane, a base cutter for cutting crops along a substantially horizontal plane, and a crop divider configured to separate crops into rows. The control system further includes a controller in electrical communication with each actuator of the plurality of actuators. The controller is configured to receive a signal indicative of an operational position of at least one actuator of the plurality of actuators, and send a signal to the at least one actuator of the plurality of actuators to initiate movement of the at least one actuator of the plurality of actuators in response to the received signal.

Other aspects of the disclosure will become apparent by consideration of the detailed description and accompanying drawings.

BRIEF DESCRIPTION OF THE DRAWINGS

FIG. 3A is a schematic view of a circular cutting mode.
FIG. 3B is a schematic view of a face cutting mode.
FIG. 4A is a schematic view of the crop positioned at the left of the harvester.
FIG. 4B is a schematic view of the crop positioned at a right of the harvester.

DETAILED DESCRIPTION

Before any embodiments of the disclosure are explained in detail, it is to be understood that the disclosure is not limited in its application to the details of construction and the arrangement of components set forth in the following description or illustrated in the following drawings. The disclosure is capable of supporting other embodiments and of being practiced or of being carried out in various ways.

Figure 1:
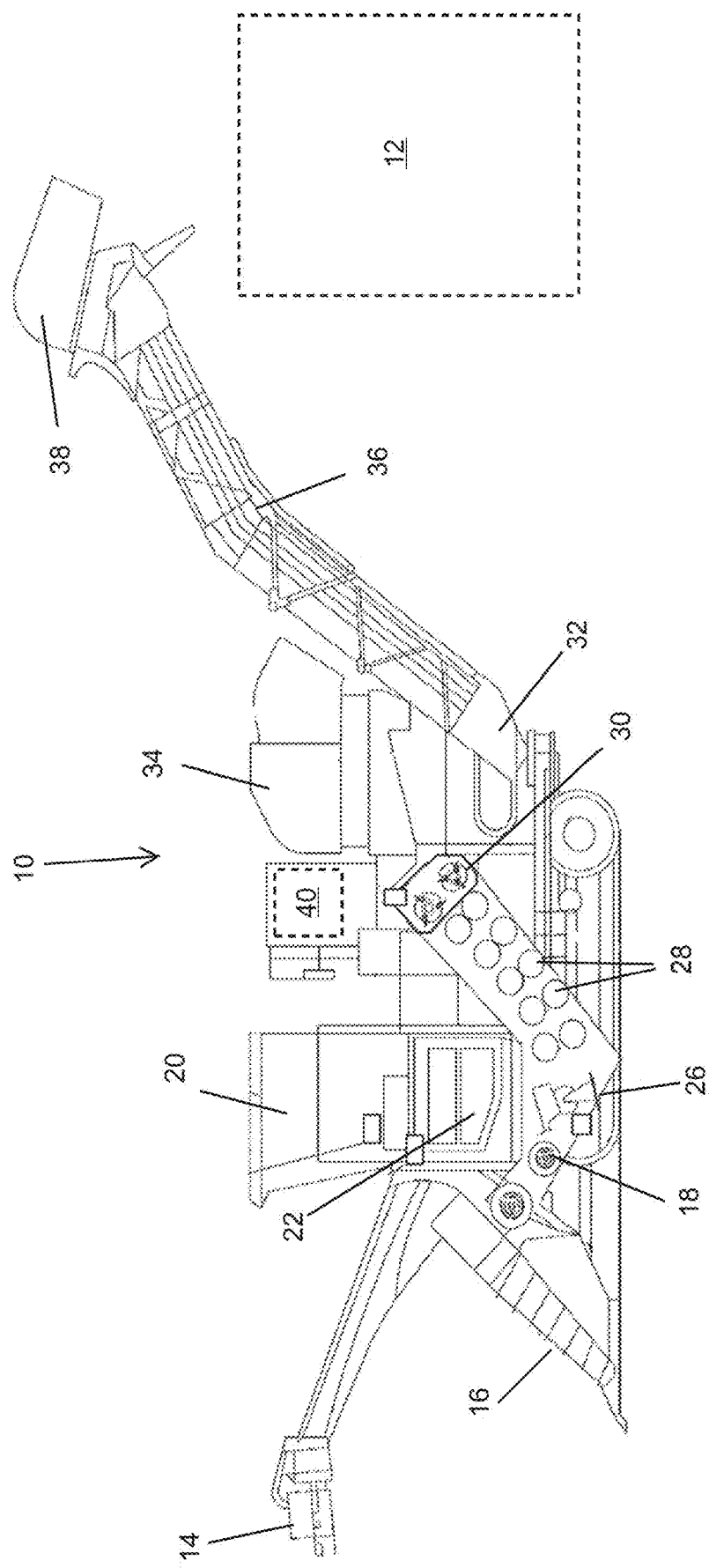
FIG. 1 is a side view of a harvester according to some embodiments.
Figure 2:
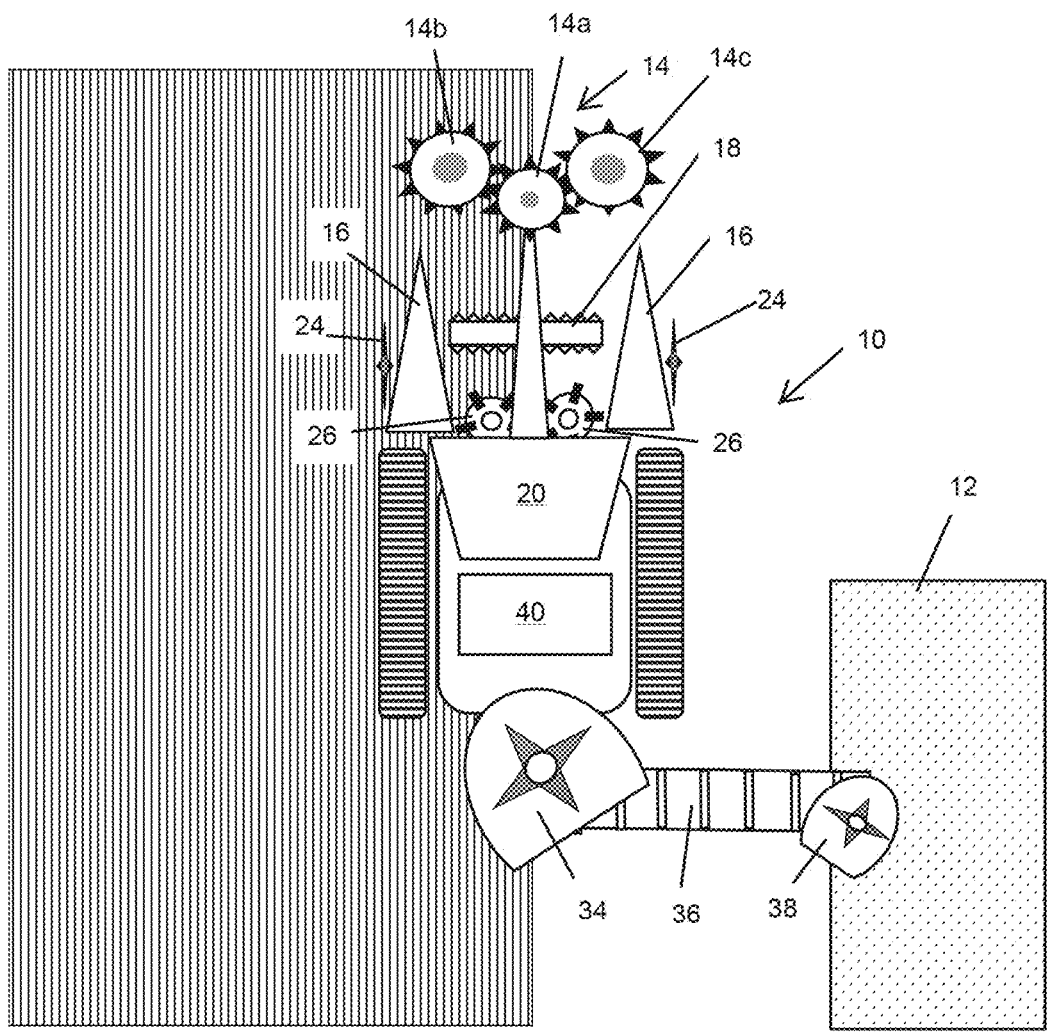
FIG. 2 is a top view of the harvester of FIG. 1.

FIGS. 1 and 2 illustrate a sugar cane harvester 10 for harvesting sugar cane and a vessel 12 for retaining the harvested sugar cane. The illustrated harvester 10 includes a topper 14, crop dividers 16, a knockdown roller 18, a cab 20, an engine 22, side knives 24, base cutters 26, feed rollers 28, a chopper 30, a basket 32, a primary extractor 34, a conveyor 36, a secondary extractor 38 and a control system 40. In some embodiments, other harvesters can be utilized in place of the illustrated sugar cane harvester 10. In still other embodiments, any conveyor structure for transporting loose material, such as mining which moves loose rocks, can be utilized in place of the illustrated sugar cane harvester 10.

FIG. 2 illustrates the unharvested crop with a plurality of vertical lines and the harvested crop as the absence of vertical lines. As shown in FIG. 2, the unharvested crop is positioned on the left of the harvester 10.

The topper 14 cuts leaves off of the top of the crops. The illustrated topper 14 includes a center disk 14a, a left side disk 14b and a right side disk 14c. The center disk 14a rotates to discharge cut tops of the crops to the portion of the field that has already been harvested. In FIG. 2, the center disk 14a rotates clockwise to discharge cut crops onto the right of the harvester 10. The left side disk 14b and the right side disk 14c in FIG. 2 rotate counter clockwise to discharge cut crops to the right side of the harvester. In some embodiments, all three of the disks 14*a*, 14*b* and 14*c* are powered, but in other embodiments, only the center disk 14*a* is powered and the left and right side disks 14*b*, 14*c* are driven by the powered center disk 14*a*. If the crop were positioned at the right side of the harvester 10, the center disk 14*a* would rotate counter clockwise and the left and right side disks 14*b*, 14*c* would rotate clockwise.

The crop dividers 16 divide the crops into separate rows to prevent uprooting of the crops. The knockdown roller 18 pushes the crop forward so that the base cutters 26 cut the crops at the ground level. The base cutters 26 cut the crop in a substantially horizontal plane. The side knives 24 cut the crop in a vertical plane substantially parallel with a travel path of the harvester 10. In FIG. 2, the unharvested crop is positioned on the left of the harvester 10. In some embodiments, only the drop divider 16, the side knife 24 and the base cutter 26 on the left side of the harvester 10 are operating while the unharvested crop is positioned on the left of the harvester 10. In some embodiments, both the left and right sides of the crop divider 16, the side knives 24 and the base cutters 26 can operate while the unharvested crop is positioned on the left side of the harvester 10.

After the crop has been cut by the base cutter 26, the feed rollers 28 move the harvested crop toward the chopper 30 to chop the harvested crop into shorter lengths and move the shorter lengths of the harvested crop into the basket 32.

The primary extractor 34 includes a hood and a fan to move leaves out of the hood such that the leaves are not directed into the basket 32. The primary extractor 34 can be pivoted to direct the leaves to the headland or previously-harvested portion of the field. FIG. 2 illustrates the primary extractor 34 oriented to direct leaves to the lower right (relative to FIG. 2). If the unharvested crop is positioned to the right of the harvester 10, the primary extractor 34 would pivot to direct leaves to the lower left (relative to FIG. 2).

The illustrated conveyor 36 is a slat conveyor that moves crops from the basket 32 and into the vessel 12. In FIG. 2, the conveyor 36 extends from left to right to direct the harvested crops into the vessel 12. The conveyor 36 extends away from the unharvested crops because the vessel 12 travels over the previously-harvested crops. If the unharvested crop were positioned on the right side, then the conveyor 36 would extend toward the left (relative to FIG. 2). In some embodiments, the illustrated conveyor 36 includes a plurality of slats to move crops up the conveyor. In some embodiments, the conveyor 36 is an auger.

The secondary extractor 38 includes a hood and a fan to move any remaining leaves out of the hood such that the leaves are not directed into the vessel 12. In FIG. 2, the secondary extractor 38 directs leaves down and to the left. If the unharvested crop were positioned on the right side, then the secondary extractor 38 would direct leaves down and to the right.

The control system 40 can control movement and operation of various components of the harvester 10 in response to input from a user. For example, the user can select a cutting mode of operation. One possible cutting mode is a circular cutting mode illustrated in FIG. 3A. In the circular cutting mode, the crop is always positioned on the same side of the harvester 10 with respect to the operator in the cab 20. In FIG. 3A, the crop is positioned on the left side of the harvester 10. The control system 40 can send electronic signals to various components of the harvester to move them into the appropriate position for cutting when the harvester 10 is cutting (see vertical arrows in FIG. 3A) and into the travel or stowed position when the harvester 10 is traveling between cutting rows (see horizontal arrows in FIG. 3A). For example, the conveyor 36 always extends to the right of the operator while cutting in FIG. 3A.

Another possible cutting mode is face cutting mode which is illustrated in FIG. 3B. This may also be referred to as a zigzag cutting mode. In the face cutting mode, the crop alternates between being positioned at the right of the harvester 10 and the left of the harvester 10. For example, when the harvester 10 is traveling downward in FIG. 3B, the crop is positioned to the left of the operator in the cab 20 and the conveyor 36 is positioned to the right of the operator. When the harvester 10 is traveling upward in FIG. 3B, the crop is positioned to the right of the operator so the conveyor 36 is positioned to the left of the operator. In the face cutting mode, the conveyor 36 alternates between being positioned to the right or the left of the operator in the cab 20.

The control system 40 can also receive an input from the user selecting a crop position with respect to the harvester 10. In FIG. 4A, the crop is positioned to the left of the harvester 10 and the user can select a crop-at-left crop position. In FIG. 4B, the crop is positioned to the right of the harvester 10 and the user can select a crop-at-right crop position. In some embodiments, the harvester 10 can harvest more than one row of crops at a time. Such two-row harvesters include three crop dividers 16 as well as other components. The control system 40 can control operation of the components of two-row harvesters in some embodiments. Some harvesters can harvest more than two rows in each pass and the control system 40 can control operation of the components of such harvesters.

The control system 40 can use the inputs from the user regarding the cutting mode (circular cutting mode or face cutting mode) and the crop position (crop-at-left or crop-at-right) to determine a future crop position relative to the harvester 10.

The user can select any of a number of features that will move automatically in response to an electronic signal from the control system 40. For example, when the user actuates a return-to-cut operation, the control system 40 can send electronic signals to actuate any or all of the following component movements:

Begin rotation or change rotational direction of the topper disk 14*a*;

Lower one or more of the crop dividers 16 into the operational position;

Begin scroll rotation of one or more of the crop dividers 16;

Lower the knockdown roller 18 into the operational position 18;

Begin rotation of one or more of the side knives 24;

Lower one or more of the side knives 24 into the operational position;

Begin rotation of one or more of the base cutters 26;

Lower one or more of the base cutters 26 into the operational position;

Actuate the feed rollers 28;

Actuator the chopper 30;

Rotate the hood of the primary extractor 34 to point away from the unharvested crop;

Actuate the fan of the primary extractor 34;

Rotate the conveyor 36 away from the unharvested crop;

Actuate the conveyor 36;

Rotate the secondary extractor 38 to point away from the vessel 12; and

Actuate the fan of the secondary extractor 38.

Similarly, when the user selects an end-of-row command, all of the functions listed in paragraph [0027] above can be moved automatically into a transport position or are set to idle speed or stopped while being transported from the end of a row until the start of the next row. Only the functions selected by the user will actuate (i.e.,begin rotation, move etc.) in response to the end-of-row command.

Figure 5:
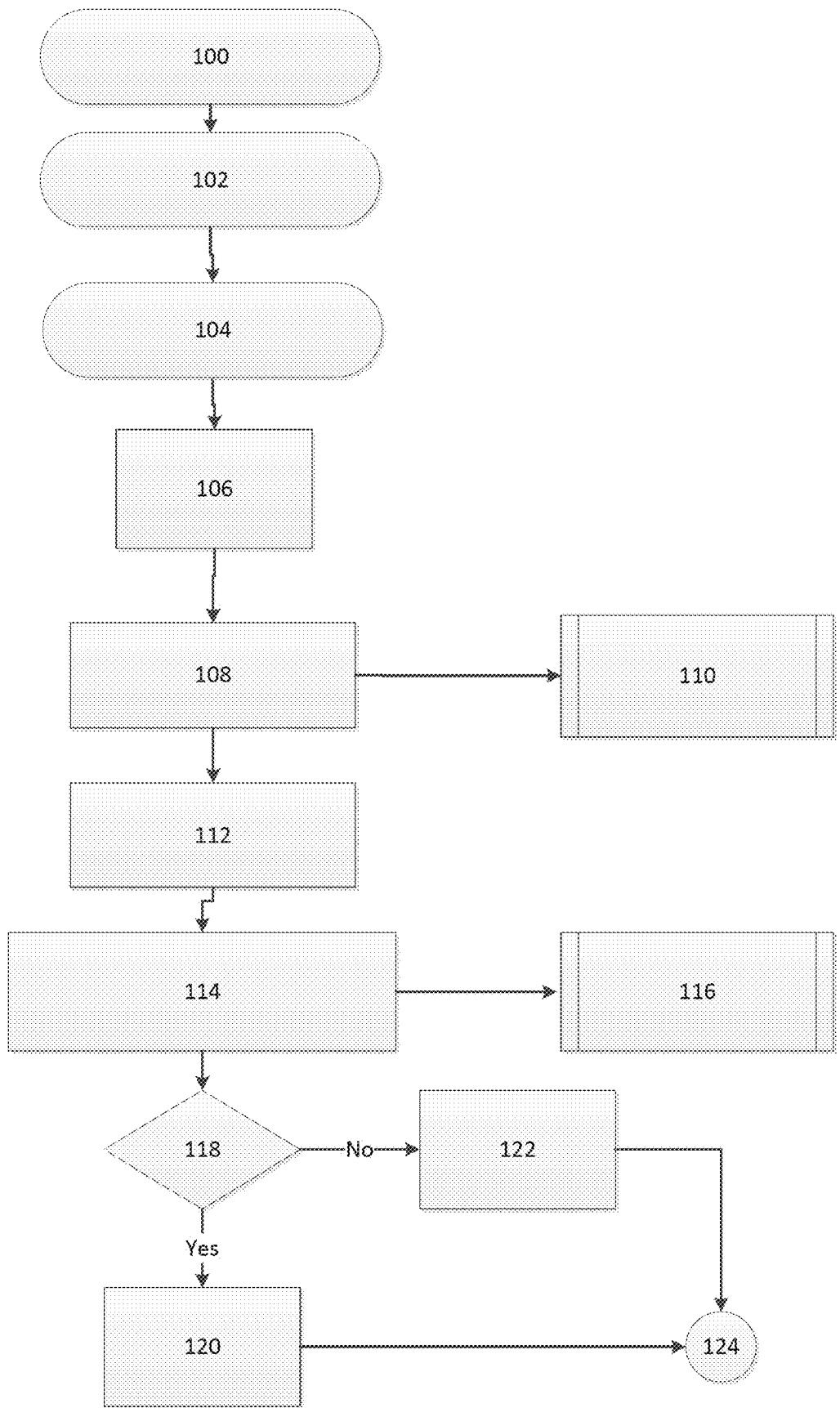
FIG. 5 is a flow chart illustrating one possible mode of operation of the harvester of FIG. 1.

FIG. 5 illustrates a flow chart including one possible method of operation of the harvester 10. At step 100, the harvester 10 is turned on and ready to operate and the user selects the return-to-cut command when the harvester 10 is positioned to begin cutting a row. At step 102, the user is then prompted to select a cutting mode of operation from the following modes of operation: circular cutting mode and face cutting mode. These cutting modes are illustrated in FIGS. 3A and 3B, respectively. At step 104, the user is then prompted to select a crop position from the following crop positions: crop at right and crop at left. These crop positions are illustrated in FIGS. 4A and 4B, respectively.

At step 106, the user is prompted to confirm which functions will be automated from the list of functions in paragraph [0027]. The user selects at least one of these functions and can, if desired, select all of these functions to occur automatically when the user selects the return-to-cut command. At step 108, the control system 40 determines the desired rotational direction of topper disks and the desired position of the conveyor 36, the primary extractor 34 and the secondary extractor 38 based upon the selected cutting mode of step 102 and the selected crop position of step 104. At step 110, all of the selected functions of step 106 occur automatically based upon the determined desired position of step 108 to prepare the harvester 10 to harvest crops.

At step 112, the user selects the end-of-row command after the harvester 10 has reached the end of a row. At step 114, the control system 40 determines the desired direction of movement of the conveyor 36, the primary extractor 34 and the secondary extractor 38 based upon the determined desired position of step 108. At step 116, all of the selected functions of step 106 are disengaged or raised automatically based upon the determined desired position of step 114 to reduce fuel consumption and lengthen the lifespan of the equipment.

At step 118, the control system 10 determines if the circular cut operating mode was selected in step 102. If the circular cut operating mode was selected, operation moves to step 120. At step 120, the control system 40 determines that the harvesting mode should not change from the selected mode in step 104. If the circular cut operating mode was not selected, operation moves to step 122. At step 122, the control system 40 determines that the harvesting mode should change from the selected mode in step 104 (i.e., if operating mode A was selected, operation changes to mode B). After steps 120 and 122, operation moves to step 124 in which at least some of the selected functions of step 106 occur while the harvester 10 is moving from the end of one row toward the start of the next row.

A first possible example of operation includes a user selecting a circular cutting row harvesting mode at step 102 (see FIG. 3A) and selecting a crop-at-left crop position in step 104 (see FIG. 4A). Then, the user selects all of the following functions at step 106:

1. Begin rotation or change rotational direction of the topper disk 14a;
2. Lower the crop dividers 16 into the operational position;
3. Begin scroll rotation of one or more of the crop dividers 16;
4. Lower the knockdown roller 18 into the operational position 18;
5. Begin rotation of one or more of the side knives 24;
6. Lower one or more of the side knives 24 into the operational position;
7. Begin rotation of one or more of the base cutters 26;
8. Lower either or both of the base cutters 26 into the operational position;
9. Actuate the feed rollers 28; and
10. Actuator the chopper 30.

At step 108, the control system 40 determines the crop position to determine which of the crop dividers 16, side knives 24, and base cutters 26 should be activated based upon the determined position of the crop with respect to the harvester 10. At step 110, the control system 40 directs the selected functions (1-8 above) to occur based upon the determination of step 108. For example, because the user selected the crop-at-left position, the topper disk 14a will begin rotating in the clockwise direction, the crop dividers 16 are lowered and begin scroll rotation, the knockdown roller 18 is lowered, the side knives 24 are lowered and begin rotation, and the base cutters 26 are lowered and begin rotation. The user can manually control any other necessary functions before the harvester 10 reaches the beginning of the row to be cut. After the cutting is completed, the user selects the end-of-row command at step 112 and the control system 40 determines which of the crop dividers 16, side knives 24, and base cutters 26 need to be deactivated based upon the determined position of the crop with respect to the harvester 10 at step 114. At step 116, the control system 40 directs the selected functions (1-8 above) to cease based upon the determination of step 114. For example, because the user selected the crop-at-left position, the topper disk 14a will stop rotating in the clockwise direction, the crop dividers 16 are raised and stop scroll rotation, the knockdown roller 18 is raised, the side knives 24 are raised and stop rotating, and the base cutters 26 are raised and stop rotating. The user can manually control any other necessary functions after the harvester 10 has finished cutting the row. Then, at step 118, the control system 40 determines if the circular cut mode was selected. Because the circular cut mode was selected, operation moves to step 120 in which the crop position with respect to the harvester 10 remains the same throughout harvesting. Operation then moves to step 124 in which the harvester 10 awaits a return-to-cut command.

A second possible example of operation includes a user selecting a face cutting row harvesting mode at step 102 (see FIG. 3B) and selecting a crop-at-right crop position in step 104 (see FIG. 4B). Then, the user selects all of the following functions at step 106:

1. Rotate the primary extractor 34 to point away from the unharvested crop;
2. Actuate the fan of the primary extractor 34;
3. Rotate the conveyor 36 away from the unharvested crop;
4. Actuate the conveyor 36;
5. Rotate the secondary extractor 38 to point away from the vessel 12; and
6. Actuate the fan of the secondary extractor 38.

At step 108, the control system 40 determines the crop position to determine the desired positions of the primary extractor 34, the conveyor 36, and the secondary extractor 38 based upon the determined position of the crop with respect to the harvester 10. At step 110, the control system 40 directs the selected functions (1-6 above) to occur based upon the determination of step 108. For example, because the user selected the crop-at-right position, the primary extractor 34 will be rotated to the left, the conveyor 36 will be rotated to the left, and the secondary extractor 38 will be rotated to the right. The user can manually control any other necessary functions before the harvester 10 reaches the beginning of the row to be cut. After the cutting is completed, the user selects the end-of-row command at step 112 and the control system 40 determines (at step 114) the desired direction of movement of the conveyor 36, the primary extractor 34, and the secondary extractor 38 based upon the determined desired position of step 108. At step 116, rotation of the fan of the primary extractor 34 and the fan of the secondary extractor 38 is slowed and may be stopped while the conveyor 36 is rotated automatically based upon the determined desired direction of movement determined at step 114 to reduce fuel consumption and lengthen the lifespan of the equipment.

For example, if the user selects the crop-at-right position, the conveyor 36 extends to the left of the harvester 10 and is further moved to extend behind the harvester 10 for transportation. The user can manually control any other necessary functions after the harvester 10 has finished cutting the row. Then, at step 118, the control system 40 determines if the circular cut mode was selected. Because the circular cut mode was not selected at step 102, operation moves to step 122 in which the crop position with respect to the harvester 10 alternates between crop-at-right and crop-at-left throughout harvesting. Operation then moves to step 124 in which the harvester 10 awaits a return-to-cut command.

Various features and advantages of the disclosure are set forth in the following claims.

What is claimed is:

1. A control system for a harvester, the control system comprising:
   a plurality of actuators, each actuator operable to control movement of one of the following: a knockdown roller for pressing crops down, a side knife for cutting crops along a substantially vertical plane, a base cutter for cutting crops along a substantially horizontal plane, and a crop divider configured to separate crops into rows; and
   a controller in electrical communication with each actuator of the plurality of actuators, the controller configured to
      receive a first signal indicative of an operational position of at least one actuator of the plurality of actuators,
      receive input from a user regarding a preselected mode of operation, and
      send a second signal to the at least one actuator of the plurality of actuators to initiate movement of the at least one actuator of the plurality of actuators in response to the received first signal and the input from the user regarding the preselected mode of operation.

2. The control system of claim 1, wherein the plurality of actuators includes
   a knockdown roller actuator configured to move the knockdown roller, the controller in electrical communication with the knockdown roller actuator, and
   wherein the controller is configured to send the second signal to the knockdown roller actuator operable to control movement of the knockdown such that the knockdown roller moves vertically in response to the received first signal.

3. The control system of claim 2, wherein the plurality of actuators includes
   a side knife actuator configured to move the side knife, the controller in electrical communication with the side knife,
   wherein the controller is further configured to send a third signal to the side knife actuator operable to control movement of the side knife such that the side knife moves vertically in response to the received first signal, and
   wherein the controller is further configured to send a fourth signal to the side knife to cause rotation of the side knife.

4. The control system of claim 1, wherein the plurality of actuators includes
   a side knife actuator configured to move the side knife, the controller in electrical communication with the side knife,
   wherein the controller is further configured to send the second signal to the side knife actuator operable to control movement of the side knife such that the side knife moves vertically in response to the received first signal, and
   wherein the controller is further configured to send a third signal to the side knife to cause rotation of the side knife.

5. The control system of claim 3, wherein the plurality of actuators includes
   a base cutter actuator configured to move the base cutter, the controller in electrical communication with the base cutter, and
   wherein the controller is further configured to send a fourth signal to the base cutter actuator operable to control movement of the base cutter such that the base cutter moves vertically in response to the received first signal.

6. The control system of claim 5, wherein the controller is further configured to send a fifth signal to the base cutter to cause rotation of the base cutter.

7. The control system of claim 2, wherein the plurality of actuators includes
   a base cutter actuator configured to move the base cutter, the controller in electrical communication with the base cutter, and
   wherein the controller is further configured to send a third signal to the base cutter actuator operable to control movement of the base cutter such that the base cutter moves vertically in response to the received first signal.

8. The control system of claim 1, wherein the controller is further configured to send a third signal to the base cutter to cause rotation of the base cutter.

9. The control system of claim 1, wherein the plurality of actuators includes
   a base cutter actuator configured to move the base cutter, the controller in electrical communication with the base cutter, and
   wherein the controller is further configured to send the second signal to the base cutter actuator operable to control movement of the base cutter such that the base cutter moves vertically in response to the received first signal.

10. The control system of claim 5, wherein the plurality of actuators includes
    a crop divider actuator configured to move the crop divider, the controller in electrical communication with the crop divider, wherein the controller is further configured to send a fifth signal to the crop divider actuator to initiate movement of the crop divider actuator in response to the received first signal.

11. The control system of claim 10, wherein the controller is further configured to send a sixth signal to the crop divider to cause rotation of the crop divider.

12. The control system of claim 3, wherein the plurality of actuators includes
a crop divider actuator configured to move the crop divider, the controller in electrical communication with the crop divider,
wherein the controller is further configured to send a fourth signal to the crop divider actuator to initiate movement of the crop divider actuator in response to the received first signal.

13. The control system of claim 2, wherein the plurality of actuators includes
a crop divider actuator configured to move the crop divider, the controller in electrical communication with the crop divider,
wherein the controller is further configured to send a third signal to the crop divider actuator to initiate movement of the crop divider actuator in response to the received first signal.

14. The control system of claim 1, wherein the controller is further configured to send a third signal to the crop divider to cause rotation of the crop divider.

15. The control system of claim 1, wherein the plurality of actuators includes
a crop divider actuator configured to move the crop divider, the controller in electrical communication with the crop divider,
wherein the controller is further configured to send the second signal to the crop divider actuator to initiate movement of the crop divider actuator in response to the received first signal.

16. The control system of claim 1, wherein the controller is further configured to receive a third signal indicative of an operational position of a second one of the plurality of actuators associated with the knockdown roller, the side knife, the base cutter, and the crop divider, and
send a fourth signal to the second one of the plurality of actuators associated with the knockdown roller, the side knife, the base cutter, and the crop divider.

17. The control system of claim 16, wherein the controller is further configured to receive a fifth signal indicative of an operational position of a third one of the plurality of actuators associated with the knockdown roller, the side knife, the base cutter, and the crop divider, and
send a sixth signal to the third one of the plurality of actuators associated with the knockdown roller, the side knife, the base cutter, and the crop divider.

18. The control system of claim 17, wherein the controller is further configured to receive a seventh signal indicative of an operational position of a fourth one of the plurality of actuators associated with the knockdown roller, the side knife, the base cutter, and the crop divider, and
send an eighth signal to the fourth one of the plurality of actuators associated with the knockdown roller, the side knife, the base cutter, and the crop divider.

19. The control system of claim 1, wherein the preselected mode of operation includes at least one mode of operation from the following list of possible modes of operation: circular cutting, face cutting, crop at left, and crop at right.

20. The control system of claim 1, wherein the controller is further configured to determine a future crop position based upon the first signal and the input from the user regarding the preselected mode of operation.

* * * * *